United States Patent
Jeong et al.

(10) Patent No.: US 10,200,933 B2
(45) Date of Patent: Feb. 5, 2019

(54) METHOD AND APPARATUS FOR TRANSMITTING DATA IN WIRELESS LAN SYSTEM

(71) Applicant: KT Corporation, Seongnam-si (KR)

(72) Inventors: Yang Seok Jeong, Seoul (KR); Joo Young Kim, Seoul (KR)

(73) Assignee: KT Corporation, Seongnam-si (KR)

( * ) Notice: Subject to any disclaimer, the term of this patent is extended or adjusted under 35 U.S.C. 154(b) by 0 days.

(21) Appl. No.: 15/867,150

(22) Filed: Jan. 10, 2018

(65) Prior Publication Data

US 2018/0132160 A1    May 10, 2018

Related U.S. Application Data

(62) Division of application No. 14/901,396, filed as application No. PCT/KR2014/006160 on Jul. 9, 2014, now Pat. No. 9,900,825.

(30) Foreign Application Priority Data

Jul. 10, 2013 (KR) .................. 10-2013-0081174

(51) Int. Cl.
*H04W 40/22* (2009.01)
*H04W 52/02* (2009.01)
*H04W 48/20* (2009.01)
*H04W 84/12* (2009.01)

(52) U.S. Cl.
CPC .......... *H04W 40/22* (2013.01); *H04W 48/20* (2013.01); *H04W 52/0216* (2013.01); *H04W 84/12* (2013.01); *Y02D 70/00* (2018.01); *Y02D 70/122* (2018.01); *Y02D 70/1244* (2018.01); *Y02D 70/1246* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/22* (2018.01); *Y02D 70/26* (2018.01)

(58) Field of Classification Search
None
See application file for complete search history.

(56) References Cited

U.S. PATENT DOCUMENTS 8,363,596 B2    1/2013  Wang et al.
2005/0009578 A1*  1/2005  Liu .................. H04W 52/0232
                                                        455/574

(Continued)

OTHER PUBLICATIONS

Christer Idland, "Detecting MAC Spoofing Attacks in 802.11 Networks through Fingerprinting on the MAC Layer," NTNU Jun. 2011, pp. 1-96.

(Continued)

*Primary Examiner* — Brian S Roberts
(74) *Attorney, Agent, or Firm* — Sughrue Mion, PLLC

(57) ABSTRACT

Disclosed are a method and an apparatus for transmitting data in a wireless LAN system. The method for transmitting data comprises the steps of: generating an activation request frame including end-point terminal identifier information for operating an end-point terminal connected to a relay device and in a wake mode; and transmitting the activation request frame to the relay device. As a result, the occurrence of a buffer overflow in the relay device can be prevented.

20 Claims, 15 Drawing Sheets

(56) References Cited

U.S. PATENT DOCUMENTS

| | | | |
|---|---|---|---|
| 2006/0165036 A1* | 7/2006 | Chandra | H04L 47/26 370/329 |
| 2010/0198952 A1* | 8/2010 | Kneckt | H04W 8/005 709/223 |
| 2013/0223419 A1* | 8/2013 | Ghosh | H04W 52/0235 370/338 |
| 2014/0092800 A1* | 4/2014 | Cho | H04W 72/04 370/311 |
| 2014/0233478 A1* | 8/2014 | Wentink | H04L 5/0055 370/329 |

OTHER PUBLICATIONS

Abdelfettah Belghith et al., "Enhancing PSM Efficiencies in Infrastructure 802.11 Networks," International Journal of Computing & Information Sciences, Apr. 2007, pp. 13-23, vol. 5, No. 1.
International Search Report of PCT/KR2014/006160 dated Oct. 2, 2014.

\* cited by examiner

FIG. 6

| ELEMENT ID | LENGTH | DTIM COUNT | DTIM PERIOD | BITMAP CONTROL | PARTIAL VIRTUAL BITMAP |
|---|---|---|---|---|---|
| 1 | 1 | 1 | 1 | 1 | 1-251 |

OCTET:

FIG. 13

| SEQUENCE | INFORMATION |
|---|---|
| 1 | RELAY AID INFORMATION |
| 2 | TERMINAL AID INFORMATION |

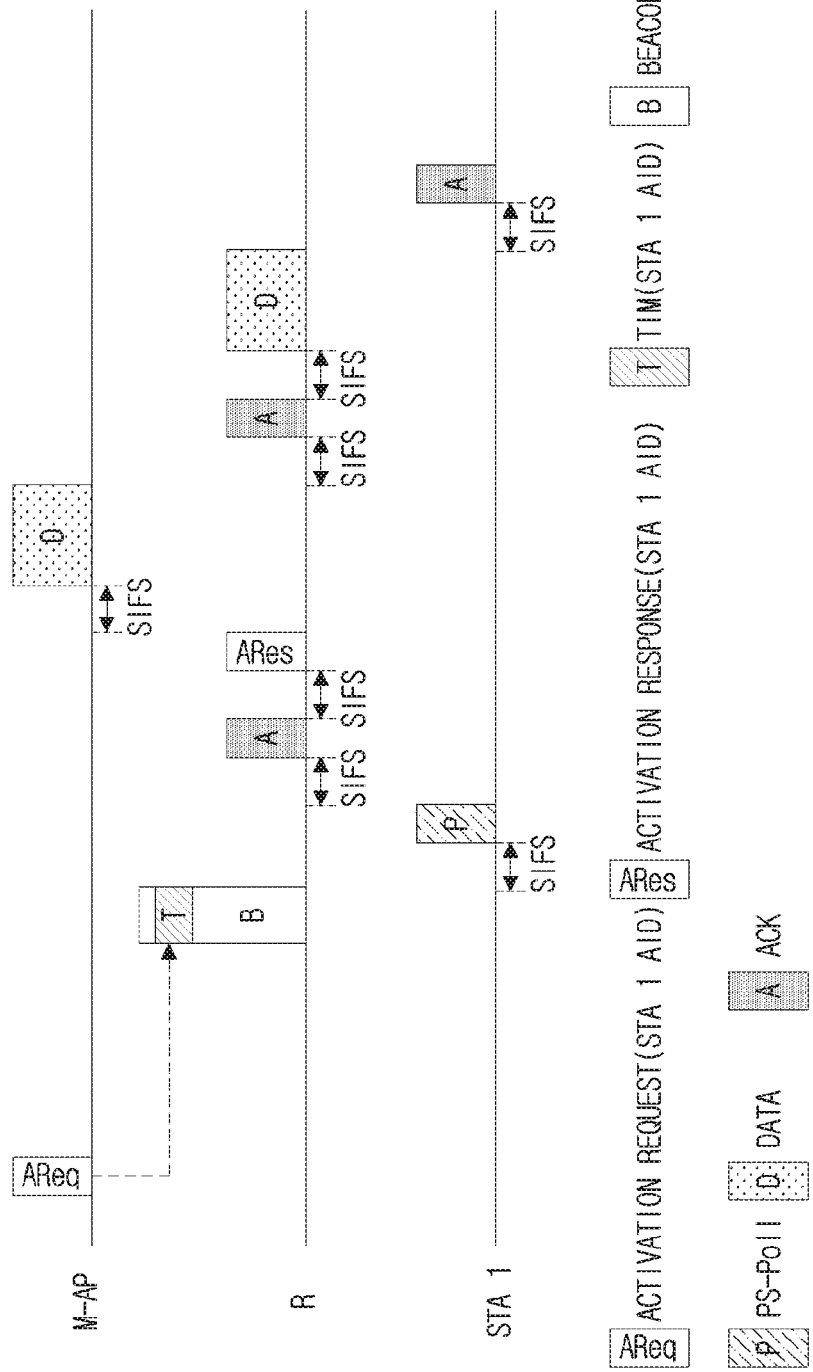

METHOD AND APPARATUS FOR TRANSMITTING DATA IN WIRELESS LAN SYSTEM

CROSS-REFERENCE TO RELATED APPLICATIONS

This application is a continuation application of U.S. patent application Ser. No. 14/901,396, filed on Dec. 28, 2015, which is a National Stage of International Application No. PCT/KR2014/006160, filed on Jul. 9, 2014, which claims priority from Korean Patent Application No. 10-2013-0081174, filed on Jul. 10, 2013, the contents of all of which are incorporated herein by reference in their entirety.

TECHNICAL FIELD

The present invention generally relates to data transmission technology in a wireless local area network (WLAN) system and, more particularly, to a method and apparatus for transmitting data to an end terminal in a WLAN system including a relay device.

BACKGROUND ART

With the development of information and communication technology, various wireless communication technologies have been developed. Among these technologies, a wireless local area network (WLAN) denotes technology for allowing wireless access to the Internet in homes, businesses or specific service areas using a mobile terminal such as a personal digital assistant (PDA), a laptop computer, a portable multimedia player (PMP), a smart phone, or a tablet PC, based on radio frequency (RF) technology.

Standards for WLAN technology have been developed as Institute of Electrical and Electronics Engineers (IEEE) 802.11 standards. WLAN technology conforming to the IEEE 802.11a standard is operated based on an orthogonal frequency division multiplexing (OFDM) scheme, and is capable of providing a maximum data rate of 54 Mbps in a 5 GHz band. WLAN technology conforming to the IEEE 802.11b standard is operated based on a direct sequence spread spectrum (DSSS) scheme, and is capable of providing a maximum data rate of 11 Mbps in a 2.4 GHz band. WLAN technology conforming to the IEEE 802.11g standard is operated based on the OFDM or DSSS scheme, and is capable of providing a maximum data rate of 54 Mbps in a 2.4 GHz band.

WLAN technology conforming to the IEEE 802.11n standard is operated based on the OFDM scheme in a 2.4 GHz band and a 5 GHz band, and is capable of providing a maximum data rate of 300 Mbps for four spatial streams when a Multiple-Input Multiple-Output OFDM (MIMO-OFDM) scheme is used. WLAN technology conforming to the IEEE 802.11n standard may support a channel bandwidth of up to 40 MHz and is capable of providing a maximum data rate of 600 Mbps in that case.

As the popularization of such WLAN technology has been activated and applications using WLANs have been diversified, the requirement for new WLAN technology that supports throughput higher than that of existing WLAN technology is increasing. Very high throughput (VHT) WLAN technology is proposed technology that supports a data rate of 1 Gbps or more. Meanwhile, in a system based on such WLAN technology, a problem arises in that, as the distance between WLAN devices increases, communication efficiency is deteriorated.

DISCLOSURE

Technical Problem

An object of the present invention to solve the above problems is to provide a data transmission method for improving the efficiency of a WLAN system.

Another object of the present invention to solve the above problems is to provide a data transmission apparatus for improving the efficiency of a WLAN system.

Technical Solution

In accordance with an embodiment of the present invention to accomplish the above objects, a communication system based on WLAN technology includes a certain terminal acting as a relay device that relays data transmitted between a master access point and an end terminal.

Here, a data transmission method performed by the master access point according to an embodiment of the present invention includes generating an activation request frame that includes identifier information of an end terminal connected to a relay device, such that the end terminal operates in an awake mode, and transmitting the activation request frame to the relay device.

Here, the identifier information of the end terminal may be an association identifier (AID).

Here, the activation response frame may include identifier information of the end terminal.

Here, the data transmission method may further include acquiring an acknowledge (ACK) frame that is a response to a power save (PS)-Poll frame that is transmitted from the relay device to the end terminal, and transmitting a data frame buffered for the end terminal to the relay device.

A data transmission method performed by a relay device according to another embodiment of the present invention to accomplish the above objects includes receiving, from a master access point, an activation request frame that includes identifier information of an end terminal connected to the relay device, generating a traffic indication map (TIM) including the identifier information of the end terminal, and transmitting a relay beacon frame including the TIM.

Here, the identifier information of the end terminal may be an association identifier (AID).

Here, the data transmission method may further include receiving a power save (PS)-Poll frame from the end terminal, transmitting an ACK frame as a response to the PS-Poll frame, transmitting an activation response frame to the master access point, the activation response frame indicating that the end terminal operates in an awake mode, receiving a data frame from the master access point, and transmitting the data frame to the end terminal.

Here, the activation response frame may include the identifier information of the end terminal.

Here, transmitting the data frame to the end terminal may be configured to transmit the data frame to the end terminal after transmitting an ACK frame that is a response to the data frame to the master access point.

Here, the data transmission method may further include receiving a PS-Poll frame from the end terminal, transmitting an ACK frame as a response to the PS-Poll frame, receiving a data frame from the master access point, and transmitting the data frame to the end terminal.

Here, transmitting the data frame to the end terminal may be configured to transmit the data frame to the end terminal after transmitting an ACK frame that is a response to the data frame to the master access point.

Advantageous Effects

In accordance with the present invention, the wireless transmission efficiency of a WLAN system can be improved.

DESCRIPTION OF DRAWINGS

FIG. 6 is a block diagram showing an embodiment of the structure of a TIM information element (IE);

FIG. 13 is a conceptual diagram showing the RTIM of a master beacon frame;

FIG. 15 is a conceptual diagram showing a data transmission method in a WLAN system including a relay device according to an embodiment of the present invention.

BEST MODE

Figure 1:
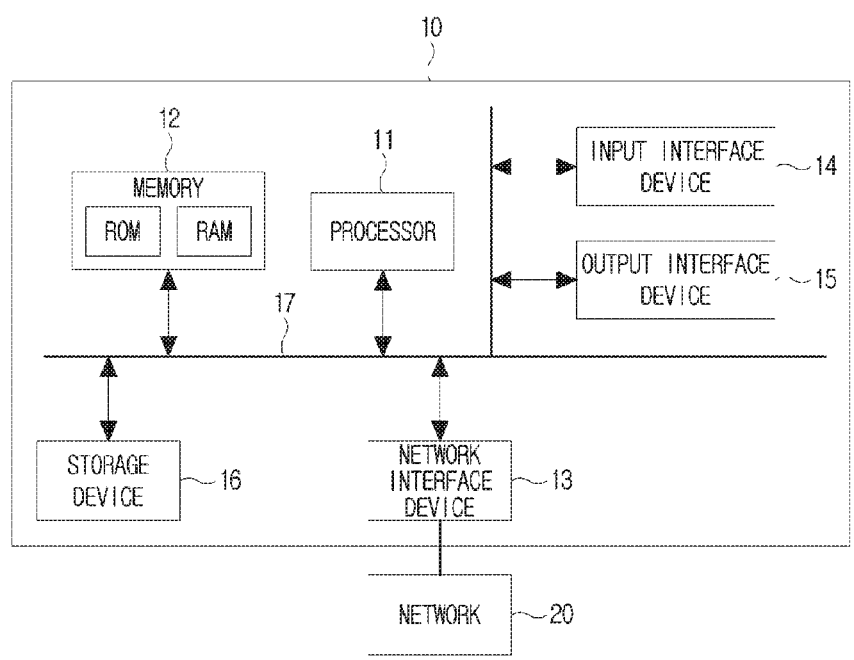
FIG. 1 is a block diagram showing an embodiment of a station for performing methods according to the present invention.

The present invention may be variously changed and may have various embodiments, and specific embodiments will be described in detail below with reference to the attached drawings.

However, it should be understood that those embodiments are not intended to limit the present invention to specific disclosure forms and they include all changes, equivalents or modifications included in the spirit and scope of the present invention.

The terms such as "first" and "second" may be used to describe various components, but those components should not be limited by the terms. The terms are merely used to distinguish one component from other components. A first component may be designated as a second component and a second component may be designated as a first component in the similar manner, without departing from the scope based on the concept of the present invention. The term "and/or" includes a combination of a plurality of related items or any of the plurality of related items.

It should be understood that a representation indicating that a first component is "connected" or "coupled" to a second component may include the case where the first component is connected or coupled to the second component with some other component interposed therebetween, as well as the case where the first component is "directly connected" or "directly coupled" to the second component. In contrast, it should be understood that a representation indicating that a first component is "directly connected" or "directly coupled" to a second component means that no component is interposed between the first and second components.

The terms used in the present specification are merely used to describe specific embodiments and are not intended to limit the present invention. A singular expression includes a plural expression unless a description to the contrary is specifically pointed out in context. In the present specification, it should be understood that the terms such as "include" or "have" are merely intended to indicate that features, numbers, steps, operations, components, parts, or combinations thereof are present, and are not intended to exclude a possibility that one or more other features, numbers, steps, operations, components, parts, or combinations thereof will be present or added.

Unless differently defined, all terms used here including technical or scientific terms have the same meanings as the terms generally understood by those skilled in the art to which the present invention pertains. The terms identical to those defined in generally used dictionaries should be interpreted as having meanings identical to contextual meanings of the related art, and are not interpreted as being ideal or excessively formal meanings unless they are definitely defined in the present specification.

Hereinafter, preferred embodiments of the present invention will be described in detail with reference to the attached drawings. For easy understanding of the entire part of the invention in the following description of the present invention, the same reference numerals are used to designate the same or similar elements throughout the drawings, and repeated descriptions of the same components will be omitted.

Throughout the present specification, a station (STA) denotes any functional medium that includes medium access control (MAC) conforming to the IEEE 802.11 standards and a physical layer interface for a wireless medium. Stations may be classified into a station (STA) that is an access point (AP) and a station (STA) that is a non-AP. The station that is an AP may be simply called an access point (AP), and the station that is a non-AP may be simply called a terminal.

A 'station (STA)' may include a processor and a transceiver, and may further include a user interface, a display device, etc. The processor denotes a unit devised to generate a frame to be transmitted over a wireless network or process a frame received over the wireless network, and may perform various functions to control the station (STA). The transceiver denotes a unit that is functionally connected to the processor and is devised to transmit and receive a frame over the wireless network for the station (STA).

An 'access Point (AP)' may denote a centralized controller, a base station (BS), a radio access station, a Node B, an evolved Node B, a relay, a Mobile Multihop Relay (MMR)-BS, a Base Transceiver System (BTS), a site controller, etc., and may include some or all of the functions thereof.

A 'terminal (i.e. non-AP)' may denote a Wireless Transmit/Receive Unit (WTRU), User Equipment (UE), a User Terminal (UT), an Access Terminal (AT), a Mobile Station (MS), a mobile terminal, a subscriber unit, a Subscriber Station (SS), a wireless device, a mobile subscriber unit, etc., and may include some or all of the functions thereof.

Here, the terminal may denote a desktop computer capable of communication, a laptop computer, a tablet PC, a wireless phone, a mobile phone, a smart phone, a smart watch, smart glasses, an e-book reader, a Portable Multimedia Player (PMP), a portable game console, a navigation device, a digital camera, a Digital Multimedia Broadcasting (DMB) player, a digital audio recorder, a digital audio player, a digital picture recorder, a digital picture player, a digital video recorder, a digital video player, etc.

FIG. 1 is a block diagram showing an embodiment of a station for performing methods according to the present invention.

Referring to FIG. 1, a station 10 may include at least one processor 11, memory 12, and a network interface device 13 connected to a network 20 and configured to perform communication. The station 10 may further include an input interface device 14, an output interface device 15, and a storage device 16. The components included in the station 10 may be connected to each other through a bus 17, and may then perform communication with each other.

The processor 11 may execute program instructions stored in the memory 12 and/or the storage device 16. The processor 11 may denote a central processing unit (CPU), a graphics processing unit (GPU), or an exclusive processor for performing the methods according to the present invention. Each of the memory 12 and the storage device 16 may be implemented as a volatile storage medium and/or a nonvolatile storage medium. For example, the memory 12 may be implemented as read only memory (ROM) and/or random access memory (RAM).

The embodiments of the present invention are applied to a WLAN system conforming to the IEEE 802.11 standards, and may also be applied to other communication systems as well as the WLAN system conforming to the IEEE 802.11 standards.

For example, the embodiments of the present invention may be applied to the mobile Internet such as a Wireless Personal Area Network (WPAN), a Wireless Body Area Network (WBAN), Wireless Broadband Internet (WiBro), or Worldwide Interoperability for Microwave Access (Wimax), a second generation (2G) mobile communication network such as a Global System for Mobile communication (GSM) or Code Division Multiple Access (CDMA), a 3G mobile communication network such as Wideband Code Division Multiple Access (WCDMA) or CDMA2000, a 3.5G mobile communication network such as High-Speed Downlink Packet Access (HSDPA) or High-Speed Uplink Packet Access (HSUPA), a 4G mobile communication network such as Long-Term Evolution (LTE) or LTE-Advanced, or a 5G mobile communication network.

Figure 2:
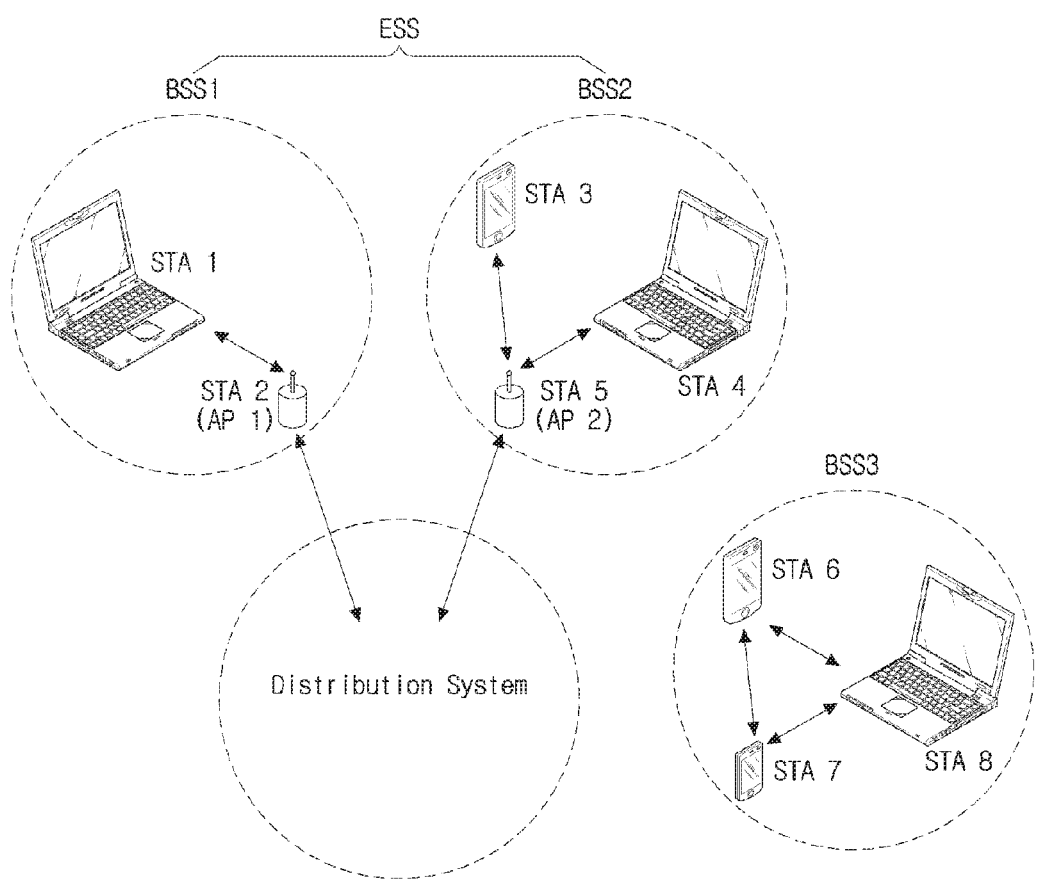
FIG. 2 is a conceptual diagram showing an embodiment of the configuration of a WLAN system conforming to IEEE 802.11.

FIG. 2 is a conceptual diagram showing an embodiment of the configuration of a WLAN system conforming to IEEE 802.11.

Referring to FIG. 2, the WLAN system conforming to IEEE 802.11 may include at least one basic service set (BSS). The BSS denotes a set of stations (STA 1, STA 2(AP 1), STA 3, STA 4, STA 5(AP 2), STA 6, STA 7, STA 8) which are successfully synchronized with each other and are capable of communicating with each other, and is not a concept meaning a specific area.

BSSs may be classified into an infrastructure BSS and an independent BSS (IBSS). Here, BSS 1 and BSS 2 denote infrastructure BSSs and BSS 3 denotes an IBSS.

BSS 1 may include a first terminal STA 1, a first access point STA 2 (AP 1) for providing a distribution service, and a distribution system (DS) for connecting multiple access points STA 2(AP 1) and STA 5(AP 2) to each other. In BSS 1, the first access point STA 2 (AP 1) may manage the first terminal STA 1.

BSS 2 may include a third terminal STA 3, a fourth terminal STA 4, a second access point STA 5 (AP 2)) for providing a distribution service, and a distribution system (DS) for connecting the multiple access points STA 2(AP 1) and STA 5(AP 2) to each other. In the BSS 2, the second access point STA 5 (AP 2) may manage the third terminal STA 3 and the fourth terminal STA 4.

BSS 3 denotes an IBSS operating in an ad-hoc mode. In the BSS 3, there is no access point that functions as a centralized management entity. That is, in the BSS 3, terminals STA 6, STA 7, and STA 8 are managed in a distributed manner. In the BSS 3, all of the terminals STA 6, STA 7, and STA 8 may denote mobile terminals, and access to the distribution system (DS) is not permitted, thus constituting a self-contained network.

The access points STA 2(AP 1) and STA 5(AP 2) may provide access to the distribution system (DS) via a wireless medium for the terminals STA 1, STA 3, and STA 4 connected thereto. Communication between the terminals STA 1, STA 3, and STA 4 in the BSS 1 or BSS 2 is generally performed via the access point STA 2 (AP 1) or STA 5 (AP 2), but direct communication may be performed between the terminals STA 1, STA 3, and STA 4 when a direct link is set up therebetween.

Multiple infrastructure BSSs may be connected to each other through the distribution system (DS). The multiple BSSs connected through the distribution system (DS) are called an extended service set (ESS). The entities included in the ESS, that is, STA 1, STA 2(AP 1), STA 3, STA 4, and STA 5(AP 2), are capable of communicating with each other, and any terminal STA 1, STA 3, or STA 4 may move from a single BSS to another BSS while performing seamless communication in the same ESS.

The distribution system (DS) is a mechanism for allowing one access point to communicate with another access point. In accordance with the DS, the access point may transmit frames for terminals coupled to a BSS managed thereby, or may transmit frames for any terminal that has moved to another BSS. Further, the access point may transmit and receive frames to and from an external network, such as a wired network. Such a DS is not necessarily a network and is not limited in its form as long as it is capable of providing a predetermined distribution service defined in the IEEE 802.11 standards. For example, the distribution system may be a wireless network such as a mesh network, or a physical structure for connecting the access points to each other.

Each terminal (STA) in the infrastructure BSS may be associated with an access point (AP). When associated with the access point (AP), the terminal (STA) may transmit and receive data.

Figure 3:
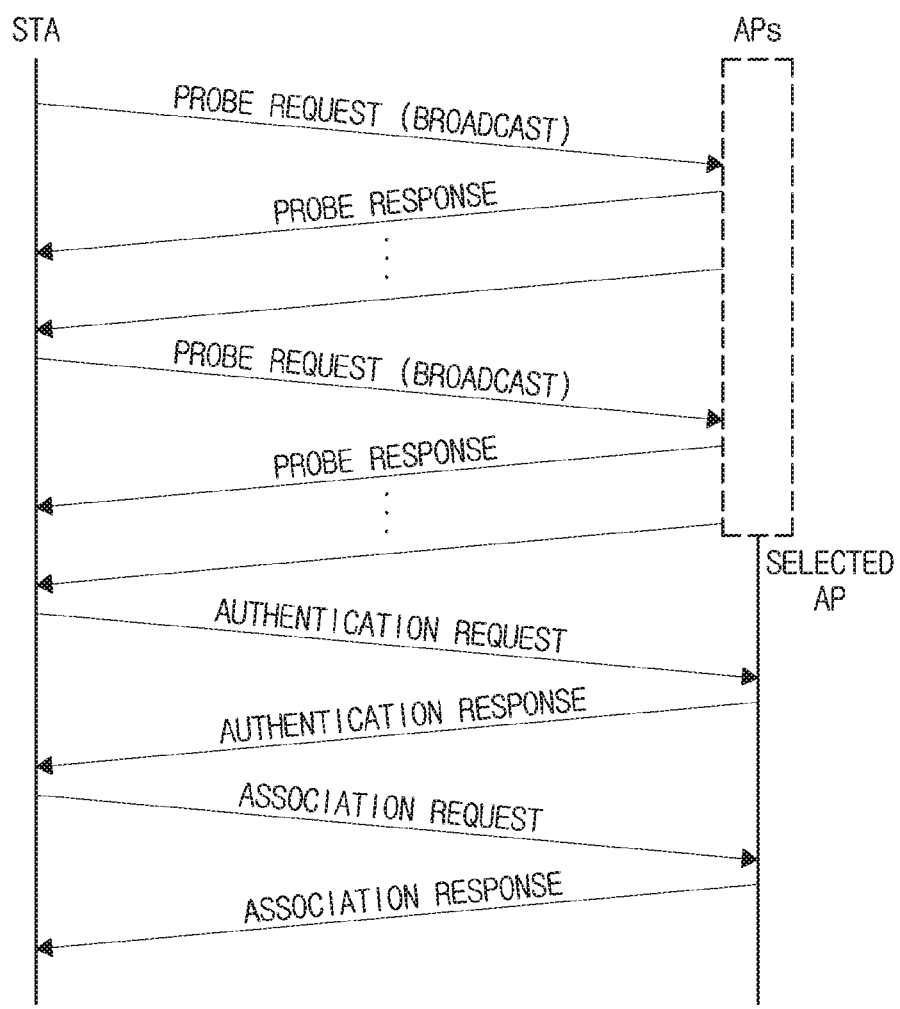
FIG. 3 is a flowchart showing a terminal association procedure in an infrastructure BSS.

FIG. 3 is a flowchart showing a terminal association procedure performed in an infrastructure BSS.

Referring to FIG. 3, the STA association procedure performed in the infrastructure IBSS may be chiefly divided into the step of probing an AP (probe step), the step of performing authentication with the probed AP (authentication step), and the step of associating with the AP with which authentication has been performed (association step).

The terminal (STA) may first probe neighboring APs using a passive scanning method or an active scanning method. When the passive scanning method is used, the terminal (STA) may probe neighboring APs by overhearing the beacons transmitted from the APs. When the active scanning method is used, the STA may probe neighboring APs by transmitting a probe request frame and receiving a probe response frame which is a response to the probe request frame from the APs.

When neighboring APs are detected, the STA may perform the step of performing authentication with each detected AP. In this case, the STA may perform the step of performing authentication with multiple APs. Authentication algorithms conforming to the IEEE 802.11 standards may be classified into an open system algorithm for exchanging two authentication frames with each other and a shared key algorithm for exchanging four authentication frames with each other.

Based on the authentication algorithms conforming to the IEEE 802.11 standards, the STA may transmit an authentication request frame and receive an authentication response frame, which is a response to the authentication request frame, from each AP, thus completing authentication with each AP.

When authentication has been completed, the STA may perform the step of associating with the AP. In this case, the STA may select a single AP from among the APs with which authentication has been performed, and may perform the step of associating with the selected AP. That is, the STA may transmit an association request frame to the selected AP and receive an association response frame, which is a response to the association request frame, from the selected AP, thus completing association with the selected AP.

The WLAN system denotes a local area network in which multiple communication entities conforming to the IEEE 802.11 standards may exchange data with each other in a wirelessly connected state.

Figure 4:
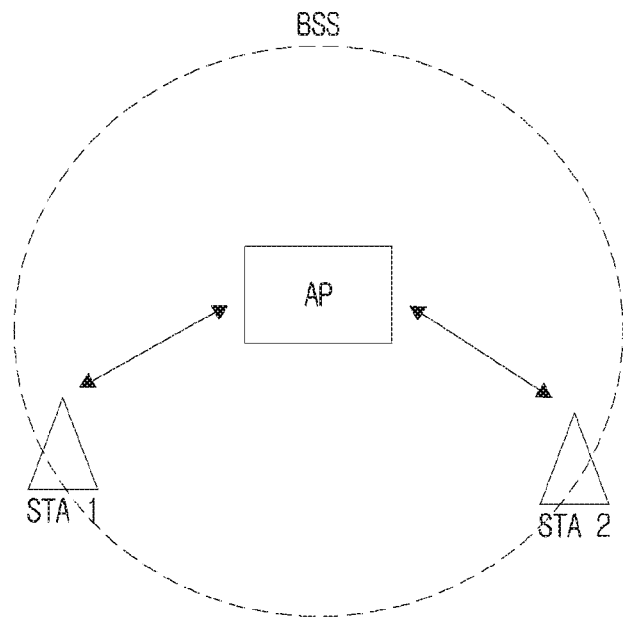
FIG. 4 is a conceptual diagram showing the infrastructure BSS of a WLAN system.

FIG. 4 is a conceptual diagram showing the infrastructure BSS of a WLAN system.

Referring to FIG. 4, the infrastructure BSS may include a single access point (AP) and multiple terminals STA 1 and STA 2. The AP may transmit a beacon frame including a service set ID (SSID), which is a unique identifier, in a broadcast manner. The beacon frame may provide information about the presence and association of the AP to terminals that are not associated with the AP, and may notify the terminals associated with the AP of the presence of data that is transmitted to a specific terminal.

Each terminal that is not associated with the AP may probe the AP using a passive scanning method or an active scanning method, and may acquire association information from the probed AP. In the case of the passive scanning method, the terminal may probe the AP by receiving a beacon frame from the AP. In the case of the active scanning method, the terminal may probe the AP by transmitting a probe request frame and receiving a probe response frame, which is a response thereto, from the AP.

Each terminal that is not associated with the AP may attempt to perform authentication with a specific AP based on association information acquired from the beacon frame or the probe response frame. A terminal that has succeeded in authentication may transmit an association request frame to the corresponding AP, and the AP, having received the association request frame, may transmit an association response frame including the AID of the terminal to the terminal. Via the above procedure, the terminal may be associated with the AP.

Figure 5:
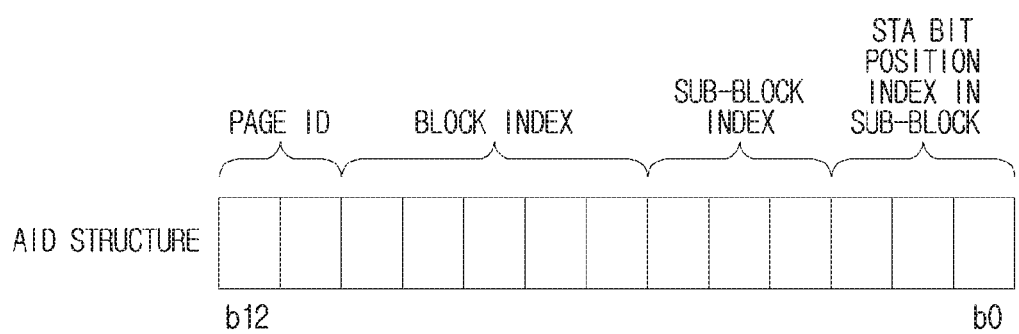
FIG. 5 is a block diagram showing an embodiment of a hierarchical AID structure.

FIG. 5 is a block diagram showing an embodiment of a hierarchical AID structure.

Referring to FIG. 5, in the IEEE 802.11 standards, an AID having a hierarchical structure may be used to efficiently manage multiple terminals. An AID assigned to a single terminal may be composed of a page ID, a block index, a sub-block index, and a terminal index (STA index). The group to which the terminal belongs (i.e. a page group, a block group, or a sub-block group) may be identified using information about individual fields.

FIG. 6 is a block diagram showing an embodiment of the structure of a traffic indication map (TIM) information element (IE).

Referring to FIG. 6, the TIM IE may include an element ID field, a length field, a delivery traffic indication message (DTIM) count field, a DTIM period field, a bitmap control field, and a partial virtual bitmap field. That is, the TIM IE includes information required to indicate a bit corresponding to the AID of a terminal when data to be transmitted to the terminal is buffered in the AP, and this information may be encoded into the bitmap control field and the partial virtual bitmap field.

Figure 7:
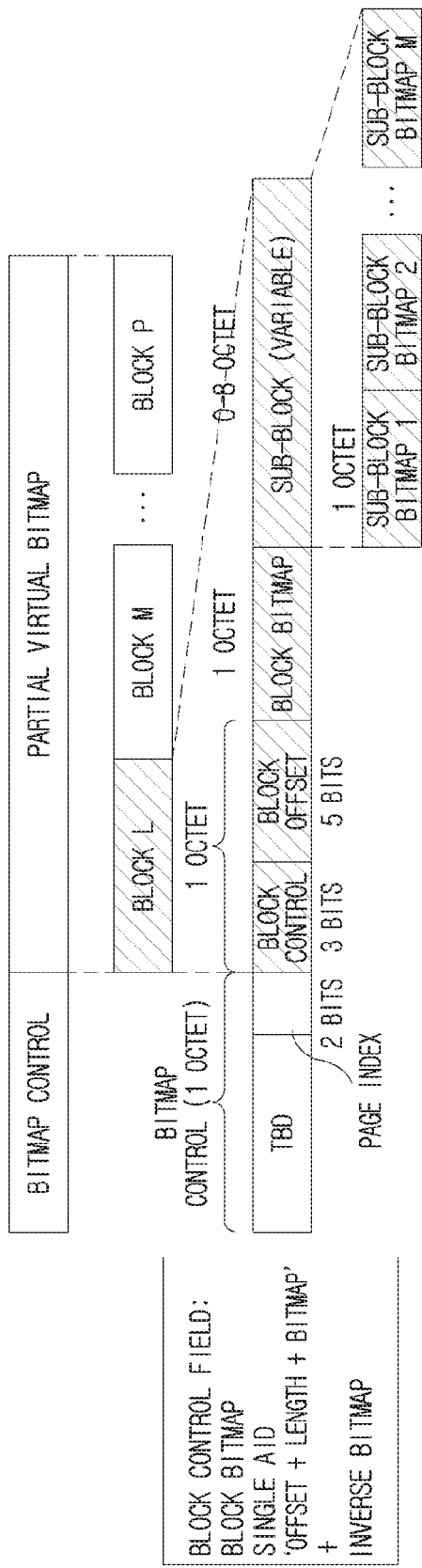
FIG. 7 is a block diagram showing an embodiment of the structure of a TIM encoded on a block basis.

FIG. 7 is a block diagram showing an embodiment of the structure of a TIM encoded on a block basis.

Referring to FIG. 7, in the IEEE 802.11 standards, the TIM may be encoded on a block basis. A single encoding block may include a block control field, a block offset field, a block bitmap field, and at least one sub-block field.

The block control field may denote the encoding mode of the TIM. That is, the block control field may represent a block bitmap mode, a single AID mode, an offset+length+bitmap (OLB) mode, or an inverse bitmap mode. The block offset field may represent the offset of an encoded block. The block bitmap field may represent a bitmap indicating the location of the sub-block in which an AID bit is set. The sub-block bitmap field may represent a bitmap indicating the location of an AID in the sub-block.

Figure 8:
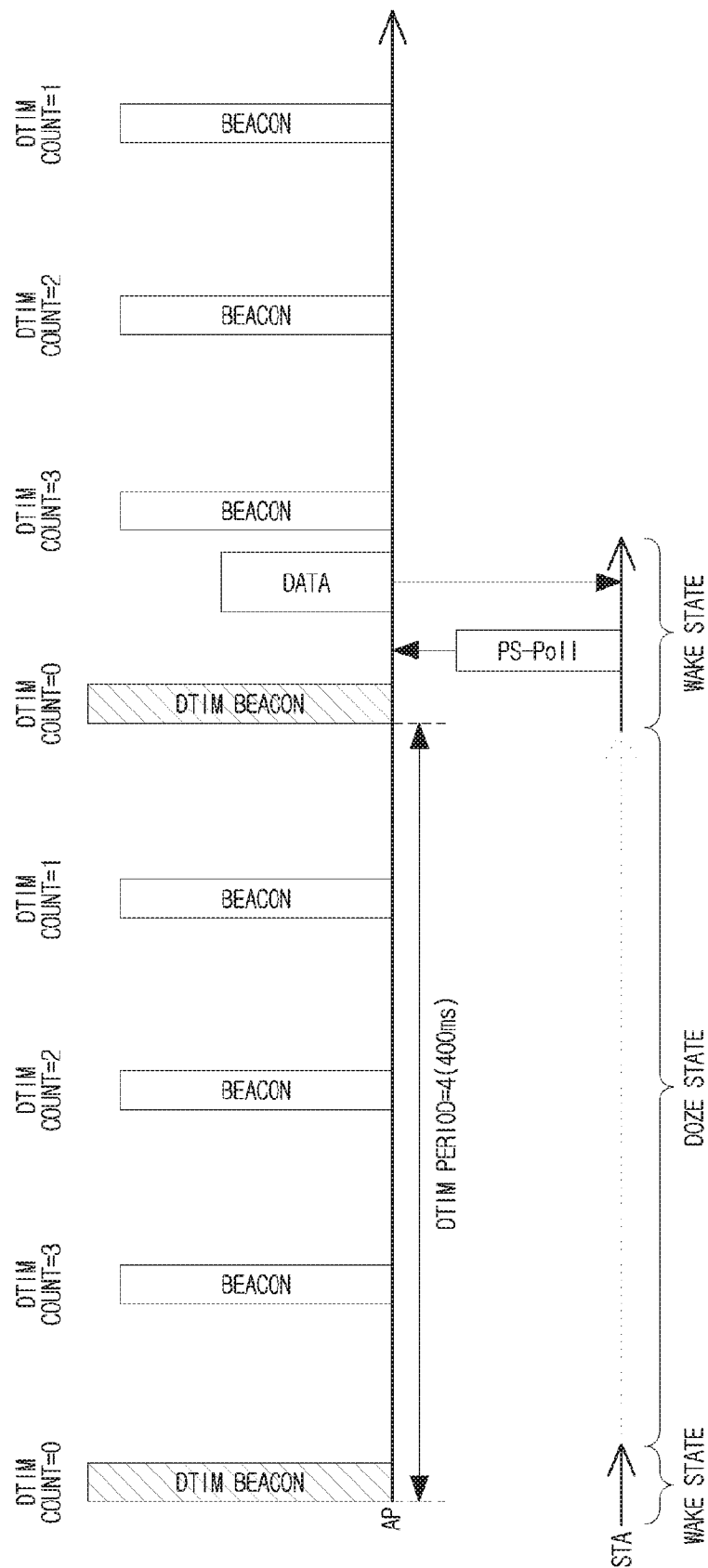
FIG. 8 is a flow diagram showing an embodiment of a data transmission/reception procedure.

FIG. 8 is a flow diagram showing an embodiment of a data transmission/reception procedure.

Referring to FIG. 8, an access point (AP) may transmit a beacon frame including a TIM IE in a broadcast manner. A terminal (STA) operating in a power save mode may be awakened at intervals of a beacon period, in which a DTIM count becomes 0, and may receive a beacon frame. The terminal (STA) is configured to, when a bit corresponding to its AID is set to '1' in the TIM included in the received beacon frame, transmit a power save (PS)-Poll frame to the AP, thus notifying the AP that the STA is ready to receive data. Upon receiving the PS-Poll frame, the AP may transmit a data frame to the corresponding STA.

In the WLAN system, communication entities (i.e. access points, terminals, etc.) share a wireless channel and contend with other entities to access the wireless channel based on a carrier sense multiple access (CSMA)/collision avoidance (CA) scheme. First, each communication entity may check the occupied state of the wireless channel using a physical channel sensing scheme and a virtual channel sensing scheme before accessing the wireless channel.

The physical channel sensing scheme may be implemented via channel sensing, which detects whether energy of a predetermined level or more is present in the wireless channel. When energy of a predetermined level or more is detected using the physical channel sensing scheme, the terminal may determine that the wireless channel is occupied by another terminal, and thus may perform again channel sensing after waiting for a random backoff time. Meanwhile, when energy of less than a predetermined level is detected using the physical channel sensing scheme, the terminal may determine that the wireless channel is in an idle state, and may then access the corresponding wireless channel and transmit a signal through the wireless channel.

The virtual channel sensing scheme may be implemented by setting a predicted channel occupation time using a network allocation vector (NAV) timer. In the WLAN system, upon transmitting a frame, a communication entity may write the time required to complete the transmission of the corresponding frame in the duration field of the header of the frame. When normally receiving a certain frame through the wireless channel, the communication entity may set its own NAV timer based on a value in the duration field of the header of the received frame. When receiving a new frame before the NAV timer has expired, the communication entity may update the NAV timer based on the value in the duration field of the header of the newly received frame. When the NAV timer has expired, the communication entity may determine that the occupation of the wireless channel has been released, and may then contend for access to a wireless channel.

The communication entity may support multiple data rates of a physical layer depending on various modulation schemes and various channel coding rates. Generally, a high data rate for the physical layer enables a large amount of data to be transmitted during a short wireless channel occupation time, but requires high signal quality. In contrast, a low data rate for the physical layer enables data to be transmitted even at low signal quality, but requires a relatively long wireless channel occupation time.

Since the resources of the wireless channel are shared between communication entities, the overall capacity of the WLAN system may be increased only when the maximum amount of data is transmitted during the time for which a specific communication entity occupies the wireless channel. That is, the overall capacity of the WLAN system may be increased when the terminal transmits and receives data to and from the AP at the highest possible data rate for the physical layer. The highest data rate for the physical layer may be realized when signal quality is sufficiently secured owing to a short distance between the AP and the terminal. If the terminals are located far away from the AP, the data rate of the physical layer becomes low, thus resulting in the reduction of the overall capacity of the WLAN system.

In the WLAN system for providing a communication service to multiple sensor terminals located over a wide area, there may occur the case where data cannot be transmitted to the entire area using only the signal output of a single AP. That is, sensor terminals that cannot be supported with a communication service may be present. Meanwhile, since a low-power sensor terminal has low signal output, the range in which the WLAN system is capable of transmitting uplink data may be further narrowed.

In particular, since a terminal located in the coverage boundary of the AP exhibits poor signal quality, the terminal performs communication with the AP at a low data rate of the physical layer. Therefore, the overall capacity of the WLAN system is drastically decreased. Further, when using the low data rate of the physical layer, the low-power terminal must be awakened for a much longer time in order to transmit the same amount of data, thus increasing power consumption.

Figure 9:
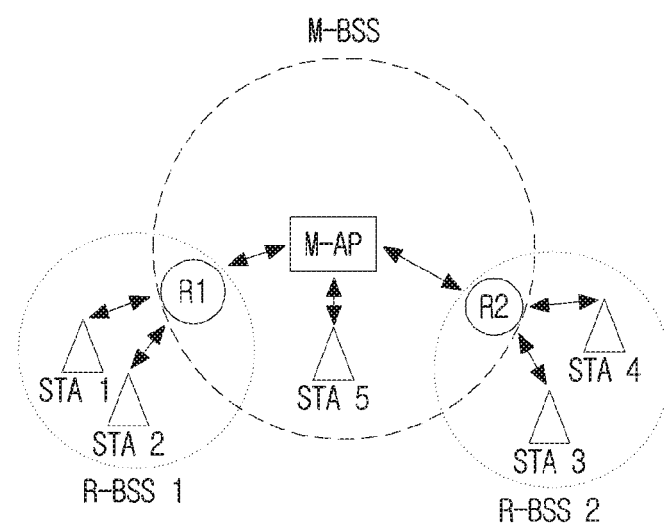
FIG. 9 is a conceptual diagram showing a WLAN system including relay devices.

FIG. 9 is a conceptual diagram showing a WLAN system including relay devices.

Referring to FIG. 9, a master access point (master-AP: M-AP), a first relay device R1, a second relay device R2, and a fifth terminal STA 5 may constitute a master BSS. The first relay device R1, a first terminal STA 1, and a second terminal STA 2 may constitute a first relay BSS. The second relay device R2, a third terminal STA 3, and a fourth terminal STA 4 may constitute a second relay BSS. The relay devices R1 and R2 may be located at the place where signal quality between the master access point (M-AP) and the terminals STA 1, STA 2, STA 3, and STA 4 is deteriorated. The first relay device R1 may relay data transmitted between the master access point (M-AP) and the first and second terminals STA 1 and STA 2. The second relay device R2 may relay data transmitted between the master access point (M-AP) and the third and fourth terminals STA 3 and STA 4. That is, the physical area of the master access point (M-AP) may be extended via the relay devices R1 and R2.

Figure 10:
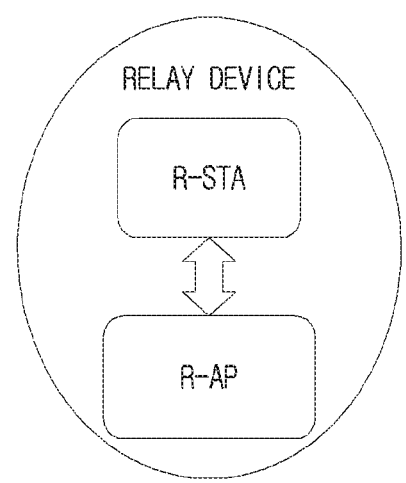
FIG. 10 is a block diagram showing the logical configuration of a relay device.

FIG. 10 is a block diagram showing the logical configuration of a relay device.

Referring to FIG. 10, the relay device may include a relay terminal (R-STA), functioning as a master access point (M-AP), and a relay access point (R-AP), functioning as an access point for terminals in an extended area.

The relay terminal (R-STA) may probe the master access point (M-AP) by receiving a beacon frame or a probe response frame transmitted from the master access point (M-AP) according to the same procedure as a normal terminal. Thereafter, the relay terminal (R-STA) may sequentially perform a procedure for authentication with the probed master access point (M-AP) and a procedure for association with the M-AP.

The relay terminal (R-STA) may relay data transmitted between the master access point (M-AP) and an end terminal. In this case, the relay terminal (R-STA) may relay data that is transmitted using a 4-address field. The 4-address field includes a destination address (DA) field indicating the address of the final destination of data, a source address (SA) field indicating the address of the place where the data was generated, a transmitter address (TA) field indicating the address of the communication entity that physically transmits a frame containing the data, and a receiver address (RA) field indicating the address of the communication entity that is to physically receive the frame containing the data.

For example, when desiring to transmit data to an end terminal via a relay device, the master access point (M-AP) may configure and transmit the header address field of a data frame as follows.

DA field: address of end terminal
SA field: address of master access point (M-AP)
TA field: address of master access point (M-AP)
RA field: address of relay device The relay terminal (R-STA) may forward a data frame received from the relay access point (R-AP) to the master access point (M-AP), and may forward a data frame received from the master access point (M-AP) to the relay access point (R-AP).

When the relay terminal (R-STA) and the master access point (M-AP) are associated with each other and a transfer path is acquired, the relay access point (R-AP) may periodically transmit a beacon frame including an identifier (SSID) identical to that of the master access point (M-AP). Also, the relay access point (R-AP) may transmit a probe response frame in response to a probe request frame from the end terminal, transmit an authentication response frame in response to an authentication request frame from the end terminal, and transmit an association response frame in response to an association request frame from the end terminal. That is, the relay access point (R-AP) may perform the same function as the master access point (M-AP).

An end terminal located near the relay device may be connected to a relay-AP (R-AP) located closer to the end terminal than the master access point (M-AP) and may secure high signal quality, thus enabling data to be transmitted at a high data rate of the physical layer.

The relay access point (R-AP) may generate a beacon frame including an indicator indicating that the R-AP itself is a communication entity for relaying data transmitted between the master access point (M-AP) and the end terminal, and may transmit the generated beacon frame. Such an indicator may be defined either using one bit in the beacon frame or using the address field of the master access point (M-AP).

The relay access point (R-AP) may transmit a data frame using a 4-address field in the same way as the relay terminal (R-STA). Alternatively, the relay access point (R-AP) may transmit a data frame using a 3-address field (SA=TA, RA, and DA) when the SA field is identical to the TA field.

Figure 11:
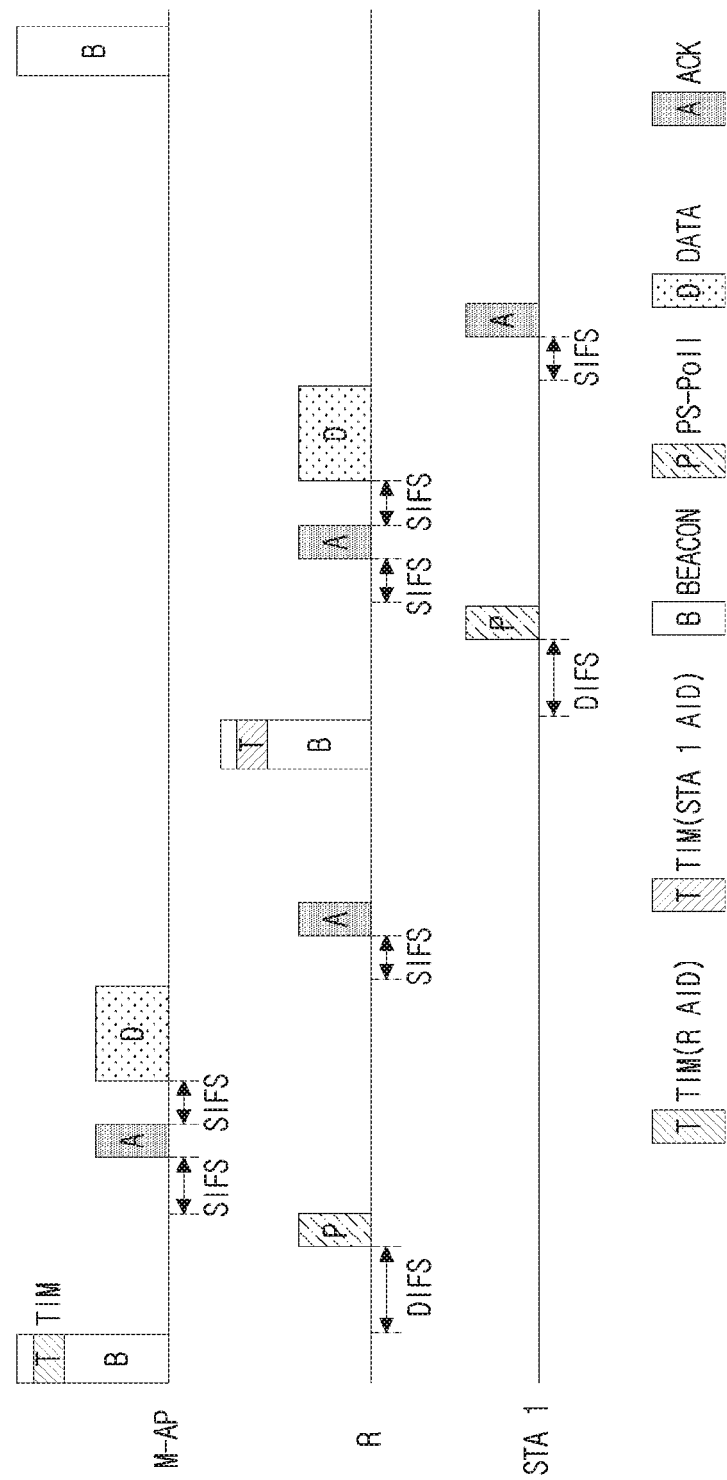
FIG. 11 is a conceptual diagram showing an embodiment of a data transmission method in a WLAN system including a relay device.

FIG. 11 is a conceptual diagram showing an embodiment of a data transmission method in a WLAN system including a relay device.

Referring to FIG. 11, a master access point (M-AP) and a relay device R may constitute a master-BSS (M-BSS), and the relay device R and a first terminal STA 1 may constitute a relay-BSS (R-BSS). When there is data to be transmitted to the first terminal STA 1 (i.e. when data for the first terminal STA 1 is buffered), the master access point (M-AP) may generate a TIM including information about the AID of the relay device R connected to the first terminal STA 1. That is, the master access point (M-AP) may set a bit, corresponding to the AID of the relay device R, in the TIM to '1'. The master access point (M-AP) may generate a master beacon frame including the TIM, and may transmit the generated master beacon frame in a broadcast manner.

The relay device R, having received the master beacon frame, may determine that, when its own AID information is included in the TIM of the master beacon frame (i.e. when a bit corresponding to its own AID in the TIM is set to '1'), data to be transmitted to the relay device R is buffered in the master access point (M-AP). The relay device R may request the transmission of data from the master access point (M-AP) by transmitting a PS-Poll frame thereto. When the PS-Poll frame is received, the master access point (M-AP) may transmit an ACK frame, as a response thereto, to the relay device R, and thereafter may transmit a data frame to the relay device R. When the data frame has been successfully received, the relay device R may transmit an ACK frame, as a response thereto, to the master access point (M-AP). Meanwhile, since the relay device R is generally operated in an awake state, a procedure for transmitting a PS-Poll frame may be omitted. That is, if a preset time (e.g. a time corresponding to short inter-frame space (SIFS)) has elapsed since the transmission of a beacon frame, the master access point (M-AP) may transmit a data frame to the relay device R.

When the data frame received from the master access point (M-AP) is a data frame to be transmitted to the first terminal STA 1, the relay device R may generate a TIM including the AID information of the first terminal STA 1. That is, the relay device R may set a bit, corresponding to the AID of the first terminal STA 1, in the TIM to '1'. The relay device R may transmit a relay beacon frame including the generated TIM in a broadcast manner.

The first terminal STA 1, having received the relay beacon frame, is configured to, when its own AID information is included in the TIM of the relay beacon frame (i.e. when a bit corresponding to its own AID in the TIM is set to '1'), recognize that data to be transmitted to the STA 1 is buffered in the relay device R. The first terminal STA 1 may request the relay device R to transmit a data frame by transmitting a PS-Poll frame to the relay device R.

When the PS-Poll frame is received, the relay device R may transmit an ACK frame, as a response thereto, to the first terminal STA 1. Thereafter, the relay device R may transmit the data frame to the first terminal STA 1. When the data frame has been successfully received, the first terminal STA 1 may transmit an ACK frame, as a response thereto, to the relay device R.

Meanwhile, the first terminal STA 1 connected to the relay device R may be operated in a power save mode. Therefore, when the first terminal STA 1 is in a doze state, the relay device R cannot immediately transmit a data frame to the first terminal STA 1, whereby the transmission of the data frame is delayed, thus causing an overflow in the buffer of the relay device R. In this case, the relay device R may notify the master access point (M-AP) that no more data frames can be received. For example, the relay device R generates an empty data frame in which the power save mode bit of a control field is set to '1', and transmits the empty data frame to the master access point (M-AP), thus notifying the M-AP that no more data frames can be received.

Generally, the case where the power save mode bit of the control field included in a frame is set to '1' means that the communication entity that transmitted the corresponding frame has transitioned to a doze state. However, since the relay device R is always operated in an awake state, the master access point (M-AP) may recognize that the residual space is not present in the buffer of the relay device R when a frame, in which a power save mode bit is set to '1', is received from the relay device R. When available space is formed later in the buffer, the relay device R may request the master access point (M-AP) to transmit a data frame by transmitting a PS-Poll frame (or an empty data frame in which a power save mode bit is set to '0') to the master access point (M-AP).

Figure 12:
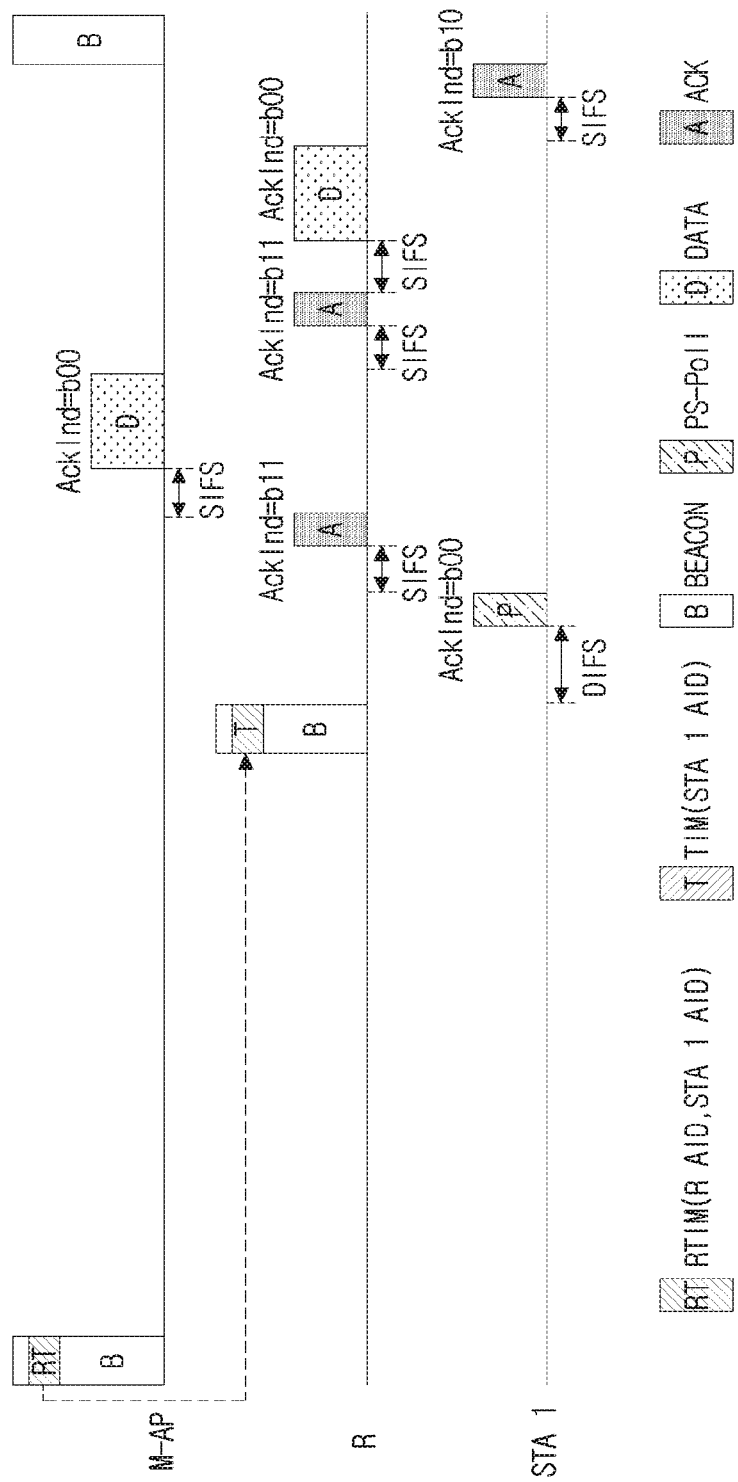
FIG. 12 is a conceptual diagram showing another embodiment of a data transmission method in a WLAN system including a relay device.

FIG. 12 is a conceptual diagram showing a data transmission method in a WLAN system including a relay device according to another embodiment of the present invention.

Referring to FIG. 12, a master access point (M-AP) and a relay device R may constitute an M-BSS, and the relay device R and a first terminal STA 1 may constitute an R-BSS. When there is data to be transmitted to the first terminal STA 1 (i.e. when data for the first terminal STA 1 is buffered), the master access point (M-AP) may generate a relay traffic indication map (RTIM) that includes both the AID information of the first terminal STA 1 and the AID information of the relay device R connected to the first terminal STA 1. That is, the master access point (M-AP) may set a bit corresponding to the AID of the first terminal STA 1 and a bit corresponding to the AID of the relay device R in the RTIM to '1'.

FIG. 13 is a conceptual diagram showing the RTIM of a master beacon frame.

Referring to FIG. 13, the RTIM of the master beacon frame may include information about the AID of a relay device and information about the AID of a terminal connected to the relay device. The AID of the relay device may mean an AID allocated by a master access point or a value derived from the AID. Further, in addition to the AID of the relay device, the MAC address of the relay device or a value derived from the MAC address may be included in the RTIM. The AID of the terminal may mean an AID allocated by the relay device or a value derived from the AID. Further, in addition to the AID of the terminal, the MAC address of the terminal or a value derived from the MAC address may be included in the RTIM. Here, the RTIM of the master beacon frame may include the AID information of multiple relay devices and the AID information of at least one terminal connected to each of the relay devices.

Referring back to FIG. 12, the master access point (M-AP) may generate a master beacon frame including an RTIM, and may transmit the generated master beacon frame in a broadcast manner. When the master beacon frame is received, the relay device R may recognize that its own AID information and the AID information of the first terminal STA 1, connected to the relay device R, are included in the RTIM of the master beacon frame (i.e. a bit corresponding to the AID of the relay device R and a bit corresponding to the AID of the first terminal STA 1 are set to '1'). That is, the relay device R may recognize that data to be transmitted to the first terminal STA 1 is buffered in the master access point (M-AP).

In this case, the relay device R may generate a TIM including the AID information of the first terminal STA 1. That is, the relay device R may generate a TIM in which a bit corresponding to the AID of the first terminal STA 1 is set to '1'. The relay device R may transmit a relay beacon frame including the TIM in a broadcast manner.

When the relay beacon frame is received, the first terminal STA 1 may recognize that its own AID information is included in the TIM of the received relay beacon frame (i.e. a bit corresponding to the AID of the first terminal STA 1 is set to '1'). That is, the first terminal STA 1 may recognize that data to be transmitted thereto is buffered in the relay device R. The first terminal STA 1 may request the transmission of data from the relay device R by transmitting a PS-Poll frame to the relay device R. Here, the first terminal STA 1 may indicate that an ACK frame is to be transmitted after the transmission of the PS-Poll frame by setting the ACK indication bit of a signal (SIG) field included in the PS-Poll frame to 'b00'. Here, the first terminal STA 1 may request the transmission of data by transmitting a separately defined frame, in addition to the PS-Poll frame, to the relay device R.

When the PS-Poll frame is received from the first terminal STA 1, the relay device R may determine that the first terminal STA 1 has been awakened, and may then transmit an ACK frame as a response to the PS-Poll frame. Here, the relay device R may indicate that a data frame is to be transmitted after the transmission of the ACK frame by setting the ACK indication bit of the SIG field included in the ACK frame to 'b11'.

Meanwhile, the master access point (M-AP) cannot receive the PS-Poll frame transmitted from the first terminal STA 1, but can receive the ACK frame transmitted from the relay device R as a response to the PS-Poll frame. Therefore, when the ACK frame transmitted from the relay device R is received, the master access point (M-AP) may determine that the first terminal STA 1 has been awakened, and may then transmit a data frame to the relay device R. At this time, the master access point (M-AP) may indicate that an ACK frame is to be transmitted after the transmission of the data frame by setting the ACK indication field of the SIG field included in the data frame to 'b00'.

When the data frame has been successfully received, the relay device R may transmit an ACK frame, as a response thereto, to the master access point (M-AP). Here, the relay device R may indicate that a data frame is to be transmitted after the transmission of the ACK frame by setting the ACK indication field of the SIG field included in the ACK frame to 'b11'.

Thereafter, the relay device R may transmit the data frame to the first terminal STA 1. At this time, the relay device R may indicate that an ACK frame is to be transmitted after the transmission of the data frame by setting the ACK indication field of the SIG field included in the data frame to 'b00'. When the data frame has been successfully received, the first terminal STA 1 may transmit an ACK frame to the relay device R. Here, the first terminal STA 1 may indicate that no frames are to be transmitted after the transmission of the ACK frame by setting the ACK indication field of the SIG field included in the ACK frame to 'b10'.

Figure 14:
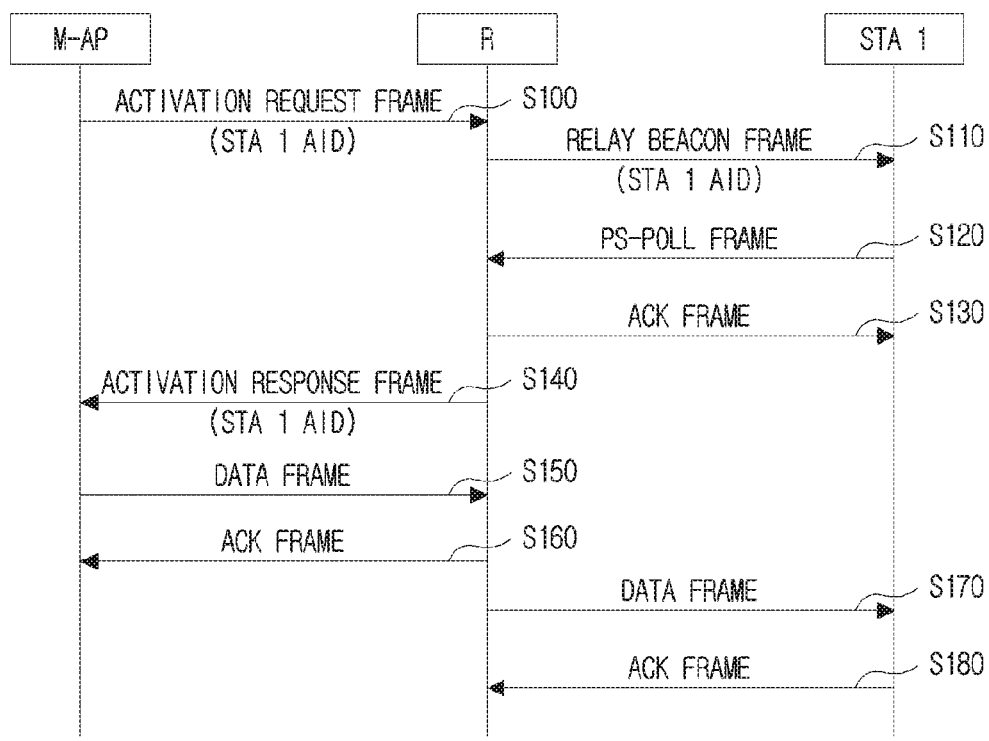
FIG. 14 is a flowchart showing a data transmission method in a WLAN system including a relay device according to an embodiment of the present invention.

FIG. 14 is a flowchart showing a data transmission method in a WLAN system including a relay device according to an embodiment of the present invention, and FIG. 15 is a conceptual diagram showing a data transmission method in a WLAN system including a relay device according to an embodiment of the present invention.

Referring to FIGS. 14 and 15, a master access point (M-AP) and a relay device R may constitute an M-BSS, and the relay device R and a first terminal STA 1 may constitute an R-BSS. When there is data to be transmitted to the first terminal STA 1 connected to the relay device R (i.e. when data for the first terminal STA 1 is buffered), the master access point (M-AP) may generate an activation request frame that requests the change of the operational state of the first terminal STA 1 to an awake mode.

The following Table 1 shows the values and meanings of a relay action field used in an activation request frame and in an activation response frame which is a response thereto.

TABLE 1

| Field value | Meaning |
| --- | --- |
| 1 | STA activation request |
| 2 | STA activation response |
| 3~255 | Reserved |

The following Table 2 shows the configuration of the activation request frame.

TABLE 2

| Sequence | Information |
| --- | --- |
| 1 | Action category (relay device) |
| 2 | Relay activation (STA activation request) |
| 3 | Terminal identifier |

The activation request frame may include an action category field, a relay action (STA activation request) field, a terminal identifier field, etc. The action category field may indicate that a certain action is the operation of the relay device R, the relay action field may indicate that the operational state of the terminal is requested to be changed to an awake mode, and the terminal identifier field may indicate the identifier information of the terminal, the operational state of which is to be changed. That is, the master access point (M-AP) may generate an activation request frame that includes the action category field indicating the operation of the relay device R, the relay action field indicating a request to change the operational state to an awake mode, and the terminal identifier field indicating the identifier information of the first terminal STA 1. Here, the identifier information of the first terminal STA 1 may mean an association identifier (AID).

The master access point (M-AP) may transmit the activation request frame to the relay device R (S100). The relay device R, having received the activation request frame, may recognize that data to be transmitted to the first terminal STA 1 is buffered in the master access point (M-AP), and that there is a request to change the operational state to the awake mode. Therefore, the relay device R may generate a TIM including the AID information of the first terminal STA 1 (i.e. a TIM in which a bit corresponding to the AID of the first terminal STA 1 is set to '1' is generated), and may transmit a relay beacon frame including the TIM in a broadcast manner (S110).

Meanwhile, the relay device R may explicitly transmit an ACK frame, as a response to a success in the reception of the activation request frame, to the master access point (M-AP). Alternatively, the relay device R may replace a response to a success in the reception of the activation request frame with a relay beacon frame. That is, since the master access point (M-AP) may acquire a relay beacon frame that is transmitted from the relay device R to the first terminal STA 1, it may determine that the relay device R has successfully received the activation request frame when identifier information included in the activation request frame is present in the acquired relay beacon frame.

When the relay beacon frame is received, the first terminal STA 1 may recognize that its own AID information is included in the TIM of the relay beacon frame (i.e. a bit corresponding to the AID of the STA 1 is set to '1'). That is, the first terminal STA 1 may recognize that data to be transmitted thereto is buffered. The first terminal STA 1 may request the relay device R to transmit data by transmitting a PS-Poll frame to the relay device R (S120). Here, the first terminal STA 1 may also request the relay device R to transmit data by transmitting a separately defined frame, in addition to the PS-Poll frame, to the relay device R.

When the PS-Poll frame is received from the first terminal STA 1, the relay device R may determine that the first terminal STA 1 operates in an awake mode, and may then transmit an ACK frame as a response to the PS-Poll frame (S130).

Thereafter, the relay device R may generate an activation response frame, indicating that the first terminal STA operates in an awake mode, in response to the activation request frame. The following Table 3 shows the configuration of the activation response frame.

TABLE 3

| Sequence | Information |
|---|---|
| 1 | Action category (relay device) |
| 2 | Relay action (STA activation response) |
| 3 | Terminal identifier |

The activation response frame may include an action category field, a relay action (STA activation response) field, a terminal identifier field, etc. The action category field may indicate that a certain action is the operation of the relay device R, the relay action field may indicate that the terminal operates in an awake mode, and the terminal identifier field may indicate the identifier information of the terminal that operates in the awake mode. That is, the relay device R may generate an activation response frame that includes the action category field indicating the operation of the relay device R, the relay action field indicating that the terminal operates in the awake mode, and the terminal identifier field indicating the identifier information of the first terminal STA 1. In this case, the identifier information of the first terminal STA 1 may mean an AID. The relay device R may transmit the activation response frame to the master access point (M-AP) (S140).

Meanwhile, the relay device R may not transmit an activation response frame indicating that the first terminal STA 1 operates in an awake mode to the master access point (M-AP). In this case, the master access point (M-AP) may be aware, in an implicit manner, that the first terminal STA 1 operates in an awake mode. That is, since the master access point (M-AP) may acquire an ACK frame which is a response to the PS-Poll frame that is transmitted from the relay device R to the first terminal STA 1, it may recognize that, when the corresponding ACK frame is acquired, the first terminal STA 1 operates in an awake mode.

When it is determined that the first terminal STA 1 operates in the awake mode, the master access point (M-AP) may transmit a data frame buffered for the first terminal STA 1 to the relay device R (S150). When the data frame has been successfully received from the master access point (M-AP), the relay device R may transmit an ACK frame, as a response to the data frame, to the master access point (M-AP) (S160). Thereafter, the relay device R may transmit the data frame to the first terminal STA 1 (S170).

Meanwhile, the relay device R may not transmit an ACK frame, which is a response to a success in the reception of the data frame, to the master access point (M-AP). In this case, the master access point (M-AP) may determine, in an implicit manner, that the relay device R has successfully received the data frame. That is, since the master access point (M-AP) may acquire a data frame that is transmitted from the relay device R to the first terminal STA 1, it may determine that, when the corresponding data frame is acquired, the relay device R has successfully received the data frame.

When the data frame has been successfully received, the first terminal STA 1 may transmit an ACK frame, as a response to the data frame, to the relay device R (S180).

In accordance with the present invention, a master access point may extend a server area via a relay device. Since a terminal may secure a link having good quality via the relay device, data may be transmitted at high speed. That is, the relay device is used, so that the efficiency of use of a wireless channel may be improved, and the amount of power consumed by the terminal may be reduced.

Further, since the master access point may request the end terminal to change an operational state to an awake mode, it may transmit data only when the end terminal is capable of receiving data. By means of this, buffer overflows may be prevented from occurring in the relay device.

Furthermore, the master access point, the relay device, and the end terminal may rapidly transmit and receive data by using a fast data transmission mode (i.e. omission of an ACK for data).

The embodiments of the present invention may be implemented in the form of program instructions that are executable via various types of computer means, and may be recorded on a computer-readable medium. The computer-readable medium may include program instructions, data files, and data structures solely or in combination. Program instructions recorded on the computer-readable medium may have been specially designed and configured for the embodiments of the present invention, or may be known to or available to those who have ordinary knowledge in the field of computer software.

Examples of the computer-readable storage medium include all types of hardware devices specially configured to store and execute program instructions, such as read only memory (ROM), random access memory (RAM), and flash memory. The hardware devices may be configured to operate as one or more software modules in order to perform the operation according to embodiments of the present invention, and vice versa. Examples of the program instructions include machine language code, such as code created by a compiler, and high-level language code executable by a computer using an interpreter or the like.

Although the present invention has been described with reference to the embodiments, those skilled in the art will appreciate that the present invention can be modified and changed in various forms, without departing from the spirit and scope of the invention as disclosed in the accompanying claims.

The invention claimed is:

1. A method for data transmission being performed by a relay device, the method comprising:
receiving, from a master access point, an activation request frame that includes an action category field and a first relay activation field; and
transmitting, to the master access point, an activation response frame that includes the action category field and a second relay activation field,
wherein the action category field indicates a relay action of the relay device,
the first relay activation field indicates an activation request for a station (STA) connected to the relay device, and
the second relay activation field indicates an activation response from the station (STA).

2. The method of claim 1, wherein the activation request frame further includes address information indicates an address of the station (STA).

3. The method of claim 2, wherein the address information of the station (STA) is an association identifier (AID).

4. The method of claim 1, wherein the method further comprises;
generating a traffic indication map (TIM) including address information of the station (STA); and
transmitting a relay beacon frame including the TIM.

5. The method of claim 4, further comprising:
receiving a power save (PS)-Poll frame from the station (STA); and
transmitting an ACK frame as a response to the PS-Poll frame.

6. The method of claim 1, wherein the activation response frame indicates that the station (STA) connected to the relay device operates in an awake mode.

7. The method of claim 1, wherein the method further comprises;
receiving a data frame from the master access point; and
transmitting the data frame to the station (STA) connected to the relay device.

8. The method of claim 7, wherein transmitting the data frame to the station (STA) is configured to transmit the data frame to the station (STA) after transmitting an ACK frame that is a response to the data frame to the master access point.

9. The method of claim 1, further comprising:
receiving a PS-Poll frame from the station (STA);
transmitting an ACK frame as a response to the PS-Poll frame;
receiving a data frame from the master access point; and
transmitting the data frame to the station (STA).

10. The method of claim 9, wherein transmitting the data frame to the station (STA) is configured to transmit the data frame to the station (STA) after transmitting an ACK frame that is a response to the data frame to the master access point.

11. A relay device for data transmission comprises:
a relay access point (R-AP); and
a relay terminal (R-STA),
wherein the relay terminal (R-STA) is configured to
receive, from a master access point, an activation request frame that includes an action category field and a first relay activation field; and
transmit, to the master access point, an activation response frame that includes the action category field and a second relay activation field,
wherein the action category field indicates a relay action of the relay device,
the first relay activation field indicates an activation request for a station (STA) connected to the relay device, and
the second relay activation field indicates an activation response from the station (STA).

12. The relay device of claim 11, wherein the activation request frame further includes address information indicates an address of the station (STA).

13. The relay device of claim 12, wherein the address information of the station (STA) is an association identifier (AID).

14. The relay device of claim 11, wherein the relay access point (R-AP) is configured to generate a traffic indication map (TIM) including address information of the station (STA) and transmit a relay beacon frame including the TIM.

15. The relay device of claim 14, wherein the relay access point (R-AP) is configured to receive a power save (PS)-Poll frame from the station (STA) and transmit an ACK frame as a response to the PS-Poll frame.

16. The relay device of claim 11, wherein the activation response frame indicates that the station (STA) connected to the relay device operates in an awake mode.

17. The relay device of claim 11, wherein the relay terminal (R-STA) is configured to receive a data frame from the master access point and the relay access point (R-AP) is configured to transmit the data frame to the station (STA) connected to the relay device.

18. The relay device of claim 17, wherein the relay access point (R-AP) is configured to transmit the data frame to the station (STA) after transmitting an ACK frame that is a response to the data frame to the master access point.

19. The relay device of claim 11, wherein the relay access point (R-AP) is configured to receive a PS-Poll frame from the station (STA) and transmit an ACK frame as a response to the PS-Poll frame; and
the relay terminal (R-STA) is configured to receive a data frame from the master access point.

20. The relay device of claim 19, wherein the relay access point (R-AP) is configured to transmit the data frame to the station (STA) after transmitting an ACK frame that is a response to the data frame to the master access point.

* * * * *